United States Patent [19]

Osaki et al.

[11] Patent Number: 4,547,946

[45] Date of Patent: Oct. 22, 1985

[54] METHOD FOR PRODUCING A NONDIRECTIONAL PEN

[75] Inventors: Kazuhiko Osaki; Hirofumi Hamamoto; Junzi Kurokawa; Shigeru Akieda, all of Tokyo, Japan

[73] Assignee: The Sailor Pen Co., Ltd., Tokyo, Japan

[21] Appl. No.: 579,650

[22] Filed: Feb. 13, 1984

[30] Foreign Application Priority Data

Feb. 28, 1983 [JP] Japan .................................. 58-30751
Nov. 9, 1983 [JP] Japan ................................ 58-209168

[51] Int. Cl.[4] .............................................. B23P 17/00

[52] U.S. Cl. .................................. 29/412; 29/157 C; 29/441 BP; 29/445; 29/DIG. 48; 401/179; 401/261; 401/265; 228/155

[58] Field of Search .................... 29/412, 441 BP, 445; 228/160, 170, 155; 401/179, 261, 265

[56] References Cited

U.S. PATENT DOCUMENTS 3,099,082 7/1963 Henriksen .................. 29/441 BP X
3,678,565 7/1972 Linz et al. ...................... 29/441 BP

*Primary Examiner*—Howard N. Goldberg
*Assistant Examiner*—Leonard S. Selman
*Attorney, Agent, or Firm*—Frishauf, Holtz, Goodman & Woodward

[57] ABSTRACT

A method for producing a nondirectional pen includes the steps of drawing a metal pipe to form a pen blank having three or more radial blade sections extending along the length of the pen blank and equally spaced angularly away from one another, each of the radial blade sections including an internal gap extending along the length of that blade section; cutting the pen blank into pen bodies having a predetermined length; shaping the forward end of each of the pen bodies into a substantially conical configuration; slotting the pen body from its tip to form longitudinal slots each aligning with the internal gap of the corresponding radial blade section; and providing a hard pen point capable of writing.

7 Claims, 13 Drawing Figures

METHOD FOR PRODUCING A NONDIRECTIONAL PEN

BACKGROUND OF THE INVENTION

1. Field of the Invention

The present invention relates to an improved method for producing a nondirectional pen.

2. Description of the Prior Art

The conventional fountain pen devices must be used to write only in a predetermined direction. To overcome such a problem, there has been proposed a nondirectional pen including three radial blade sections equally angurally spaced away from one another and being generally formed into a conical shape with the tip thereof including a pen point ball welded thereto. Such a nondirectional pen is produced by providing three of substantially triangle-shaped plates, bending each of the triangle-shaped plates along the length thereof into a V-shape with an angle of 120 degrees and spot-welding these triangle-shaped bent plates at their back faces. This process requires many steps resulting in increased manufacturing cost. Furthermore, there is also a problem in that upon spot-welding, the plates are frequently misaligned with one another to provide a rejected product. The resulting pen has its poor ink-holding ability since the ink is transferred to the tip of the pen along the bottom of the V-shaped groove of the respective bent plate. If the pen is placed without its cap for a very short time, the supply of the ink may immediately be stopped. This problem can be solved by providing a particular ink-holding means in the pen. However, this solution adds at least one further working step to the previous working steps.

SUMMARY OF THE INVENTION

It is therefore an object of the present invention to provide an improved method for producing a nondirectional pen which can continuously supply the ink to the tip thereof even if the pen is left as it is.

Another object of the present invention is to provide an improved method for producing such a nondirectional pen by the use of a simplified process which is reduced in the number of steps.

In one aspect of the present invention, the method for producing a nondirectional pen comprises the steps of drawing a metal pipe to form a pen blank having three or more radial blade sections extending along the length of said pen blank and equally spaced angularly away from one another, each of said radial blade sections including an internal gap extending along the length of that blade section; cutting said pen blank into pen bodies having a predetermined length; shaping the forward end of each of said pen bodies into a substantially conical configuration; welding a pen point ball to the tip of said pen body; slotting said pen body from its tip to a predetermined depth through said pen point ball to form longitudinal slots each aligning with the internal gap of the corresponding radial blade section; holding said pen body in such a state that said longitudinal slots are closed and then grinding said pen point ball into a symmetrical shape about the pen point of said pen body; and plastically deforming said pen body such that the slots formed in said pen point ball will be in their closed condition.

In another aspect of the present invention, the method for producing a nondirectional pen comprises the steps of drawing a metal pipe to form a pen blank having three or more radial blade sections extending along the length of said pen blank and equally spaced angularly away from one another, each of said radial blade sections including an internal gap extending along the length of that blade section; cutting said pen blank into pen bodies having a predetermined length; shaping the forward end of each of said pen bodies into a substantially conical configuration while at the same time forming the tip of said pen body into a semi-spherical shape to provide a pen point; slotting said pen body from its tip to from longitudinal slots each aligning with the internal gap of the corresponding blade section; and hardening the semi-curcular tip of said pen body.

Other objects and features of the present invention will be apparent from reading the following description in connection with the accompanying drawings.

DETAILED DESCRIPTION OF PREFERRED EMBODIMENTS

Figure 1:
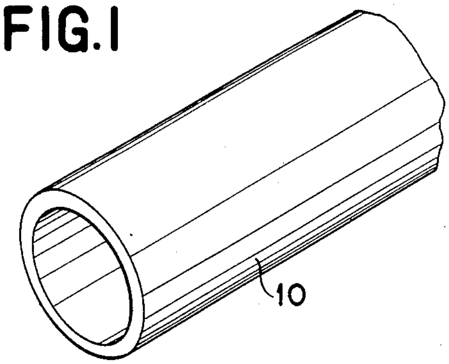
FIG. 1 is a perspective view of part of a pipe material which can be used in the method accroding to the present invention.
Figure 2:
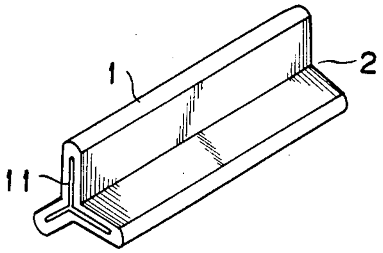
FIG. 2 is a perspective view of an original pen body prepared by drawing and cutting the pipe material of FIG. 1 into a predetermined length.

Referring first to FIG. 1, there is herein shown a stainless steel pipe 10 having an outer diameter of about five millimeters and a wall thickness of about 0.3 millimeters. In the first step, the pipe 10 is drawn through a suitable die to form a pen blank having a plurality of radial blade sections 1 (three shown) which are equally spaced angularly away from one another by 120 degrees and each of which has a thickness of about one millimeter, as shown in FIG. 2. A V-shaped groove 2 opened through 120 degrees is thus formed between each adjacent radial blade sections 1. Each of the radial blade sections 1 has an internal gap of about 0.1 millimeters width which is defined by the inner wall of the deformed pipe 10. The V-shaped grooves 2 and internal gaps extend along the length of the thus formed pen blank.

The pen blank is cut into a plurality of pen bodies each having a predetermined length as shown in FIG. 2. For example, the predetermined length is about 15 millimeters.

Figure 3:
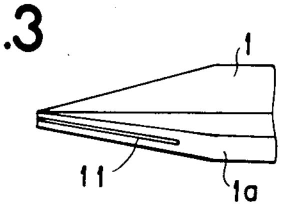
FIG. 3 is a side view showing the pen body after it has been shaped and slotted.

In the next step, as shown in FIG. 3, the forward end of each of the pen bodies is ground into a substantially conical shape to provide outer arched surfaces 1*a*. At the same time, the tip of the pen body is shaped to provide a semi-spherical recess of about one millimeter diameter.

Figure 4:
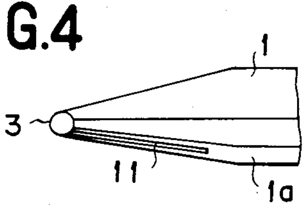
FIG. 4 is a side view showing the pen body after a pen point ball has been welded to the shaped tip of the pen body.

In the next step, as shown in FIG. 4, a pen point ball 3 of stainless steel having the same diameter as that of the semi-spherical recess formed in the tip of the pen body is welded in said recess to provide the outline of the pen.

Figure 5:
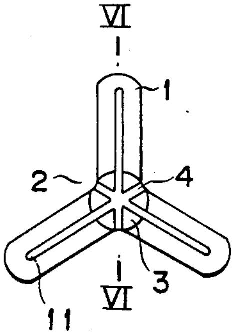
FIG. 5 is a front view of the pen body shown in FIG. 4.
Figure 6:
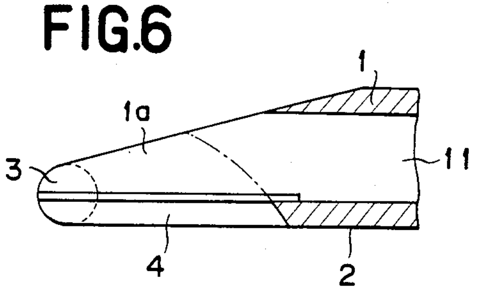
FIG. 6 is a longitudinal section of the pen body, taken along a line VI—VI in FIG. 5.
Figure 7:
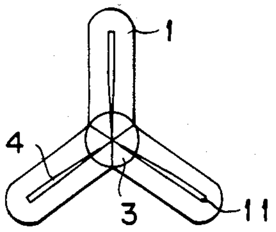
FIG. 7 is a view similar to FIG. 5, showing the pen body positioned in the other working step.

In the subsequent step, three intersecting slot 4 are formed in the pen body from the pen point ball on the tip thereof through a predetermined longitudinal extent with each of these slots being disposed to connect the internal gap of each blade section 1 with the corresponding V-shaped groove 2 which is defined between each adjacent blade sections on the side opposite to said internal gap, as shown in FIGS. 5 and 6. Each of the longitudinal slots 4 serves not only as an ink passageway for supplying the ink to the pen point ball 3, but also as means for causing the pen to be flexible to provide a good writing feel and to promote the supply of ink. Also, the internal gap 11 serves as ink retaining means since it communicates with the corresponding slot 4. Each of these slots 4 may be of a transverse width in the range of 0.1 to 0.15 millimeters which would provide a poor capillary action and prevent the smooth run of the pen on the paper face. Therefore, the slots 4 will be closed in the final step described below. Under such a condition that all the slots are closed in the final step, the pen point ball 3 does not have its true semispherical shape. As shown in FIG. 7, therefore, the pen body is frimly held as by a chuck with the slots 4 being closed. In this state, the pen point ball and optionally surrounding pen tip portion are ground as by a hard whetstone to provide a symmetrical configuration about the pen tip portion. This ensures that the pen has its nondirectional property.

The edges of the slots 4 may have fine burrs at the slotting and grinding steps. It is therefore preferred that when the pen body is firmly held as by a chuck with all the slots being opened as shown in FIG. 5, the edges of the slots 4 are chamfered as by a soft whetstone with a radius of curvature equal to about 0.02 R. This also ensures the smooth run of the pen on the paper face.

Figure 8:
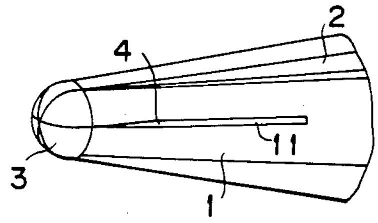
FIG. 8 is a perspective view showing a finished pen.
Figure 9:
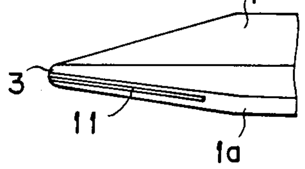
FIG. 9 is a view similar to FIG. 4, showing the pen body worked by the method of another embodiment of the present invention.
Figure 10:
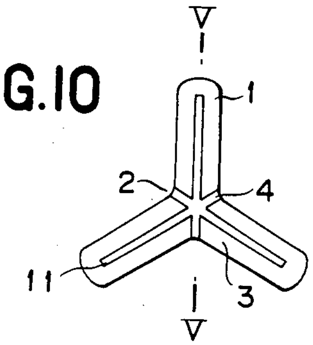
FIG. 10 is a view similar to FIG. 5, showing the pen body of FIG. 9.
Figure 11:
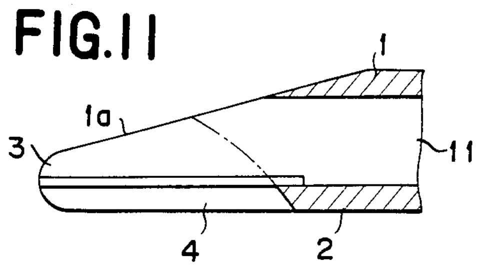
FIG. 11 is a view similar to FIG. 6, showing the pen body of FIG. 9.

In the final step, as shown in FIG. 8, the pen body is plastically deformed to close the slots 4 as by a press to provide a finished pen. This finished pen is then mounted on a three-pronged pen core with the resulting assembly being mounted in a pen holder to provide a fountain pen.

Figure 12:
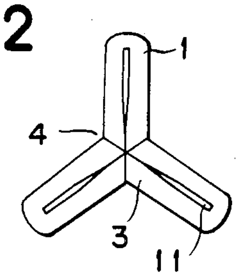
FIG. 12 is a view similar to FIG. 7, showing the pen body of FIG. 9.
Figure 13:
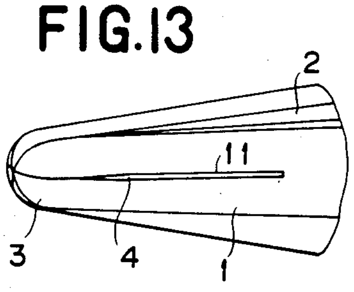
FIG. 13 is a perspective view similar to FIG. 8, showing a finished pen produced in accordance with said another embodiment of the present invention.

FIGS. 9 to 13 show the steps of a process for producing a nondirection pen in accordance with another embodiment of the present invention. In these figures, similar reference numerals denote similar parts as in the first embodiment of the present invention described above in connection with FIGS. 1 to 8. The nondirectional pen is worked substantially in the same manner as in the previous embodiment of the present invention, except that the tip 3 of the pen body is shaped into a semi-spherical form having a radius equal to about 0.5 millimeters without use of the pen point ball 4 welded thereto. As in the previous embodiment, the rounded tip of the pen body does not have its complete semispherical shape after the pen body has been slotted and when the formed slots are closed as shown in FIG. 12. Consequently, the tip 3 of the pen body is reshaped and finished in such a closed state as shown in FIG. 12 in the same manner as described hereinbefore. Of course, any burrs may be removed as in the previous embodiment.

In the second embodiment of the present invention, the re-shaped and finished tip of the pen body is hardened by any suitable hardening process such as ionitriding, ion plating and hard chromium plating. These hardening processes will be exemplified below.

(1) Ionitriding

The pen body was grasped by a chuck used also as cathode and placed in the atmosphere of nitriding gas such as $CH_4$, $N_2$, $H_2$ or the like. Next, DC voltage of several hundreds volts was applied to create a glow discharge relative to the tip 3 of the pen body under the following conditions:

EXAMPLE 1

| | |
|---|---|
| Ratio of gases | $N_2$:$H_2$ = 1:1 |
| Temperature of treatment | 510° C. |
| Time of treatment | 40 minutes |

EXAMPLE 2

| | |
|---|---|
| Ratio of gases | $N_2$:$H_2$ = 2:3 |
| Temperature of treatment | 500° C. |
| Time of treatment | 60 minutes |

EXAMPLE 3

| | |
|---|---|
| Ratio of gases | $N_2$:$H_2$:$CH_4$ = 1:1:2 |
| Temperature of treatment | 550° C. |
| Time of treatment | 90 minutes |

(2) Ion plating

Under the following conditions, the tip 3 of the pen body was plated with a high hardness material such as metallic nitride or metallic carbide.

EXAMPLE 4

| | |
|---|---|
| Vacuum | 1 × 10 - 10 Pa |
| Amount of $N_2$ | 50 ml/min. |
| Pressure of $N_2$ | 2 Kg/cm$^2$ |
| Time of treatment | 20 minutes |
| Reacting metal | Titanium |
| Temperature of treatment | 150° C. |

EXAMPLE 5

| | |
|---|---|
| Vacuum | 1 × 10 - 10 Pa |
| Amount of $C_2H_2$ gas | 10 ml/min. |
| Pressure of the same gas | 1 Kg/cm$^2$ |
| Time of treatment | 10 minutes |
| Reacting metal | Titanium |
| Temperature of treatment | 200° C. |

EXAMPLE 6

| | |
|---|---|
| Vacuum | $1 \times 10 - 5 \times 10$ Pa |
| Amount of $CH_4$ gas | 50 ml/min. |
| Pressure of the same gas | 1 $Kg/cm^2$ |
| Time of treatment | 10 minutes |
| Reacting metal | Silicon |
| Temperature of treatment | 200° C. |

(3) Hard chromium plating

Under the following conditions, the tip 3 of the pen body is plated by hard chromium.

EXAMPLE 7

| | |
|---|---|
| Chromium oxide | 250 g/l |
| Sulphuric acid | 2.5 g/l |
| Temperature of treatment | 45–55° C. |
| Density of current | 60-80 $A/dm^2$ |

In all the above examples, the tip 3 of the pen body was sufficiently hardened to provide a durable pen.

After the hardening step, the forward end of the pen body is pressed to close the slots 11 as shown in FIG. 7. The complete pen is mounted on a three-pronged pen core with the resulting assembly being in turn mounted in a pen holder to provide a fountain pen.

Although the embodiments of the present invention have been described as to the pen body having three blade sections in connection with the drawings, the present invention may be applied to any pen body having four or more blade sections.

What is claimed is:

1. A method for producing a nondirectional pen, comprising the steps of drawing a metal pipe to form a pen blank having three or more radial blade sections extending along the length of said pen blank and equally spaced angularly away from one another, each of said radial blade sections including an internal gap extending along the length of the blade section; cutting said pen blank into pen bodies having a predetermined length; shaping the forward end of each of said pen bodies into a substantially conical configuration; welding a pen point ball to the tip of said pen body; slotting said pen body from its tip to a predetermined depth through said pen point ball to form longitudinal slots each aligning with the internal gap of the corresponding radial blade section; holding said pen body in such a state that said longitudinal slots are closed and then grinding said pen point ball into a symmetrical shape about the pen point of said pen body; and plastically deforming said pen body such that the slots formed in said pen point ball will be in their closed condition.

2. A method for producing a nondirectional pen, comprising the steps of drawing a metal pipe to form a pen blank having three or more radial blade sections extending along the length of said pen blank and equally spaced angularly away from one another, each of said radial blade sections including an internal gap extending along the length of that blade section; cutting said pen blank into pen bodies having a predetermined length; shaping the forward end of each of said pen bodies into a substantially conical configuration while at the same time forming the tip of said pen body into a semi-spherical shape to provide a pen point; slotting said pen body from its tip to form longitudinal slots each aligning with the internal gap of the corresponding blade section; and hardening the semi-curcular tip of said pen body.

3. A method for producing a nondirectional pen as defined in claim 1, further including the step of holding said pen body in such a state that the slots formed therein are opened and then chamfering the edges of at least the slots formed in the pen point ball or the tip of said pen body.

4. A method for producing a nondirectional pen as defined in claim 2 wherein said hardening step includes the ionitriding process.

5. A method for producing a nondirectional pen as defined in claim 2 wherein said hardening step includes the ion plating process.

6. A method for producing a nondirectional pen as defined in claim 2 wherein said hardening step includes the hard chromium plating process.

7. A method for producing a nondirectional pen as defined in claim 2, further including the step of holding said pen body in such a state that the slots formed therein are opened and then chamfering the edges of at least the slots formed in the pen point ball or the tip of said body.

* * * * *